United States Patent [19]

Davis

[11] Patent Number: 5,108,727
[45] Date of Patent: Apr. 28, 1992

[54] SYNTHESIS OF CRYSTALLINE ALUMINOPHOSPHATE COMPOSITION

[75] Inventor: Mark E. Davis, Blacksburg, Va.

[73] Assignee: Mobil Oil Corporation, Fairfax, Va.

[21] Appl. No.: 543,633

[22] Filed: Jun. 26, 1990

[51] Int. Cl.⁵ .............................................. C01B 25/36
[52] U.S. Cl. .................... 423/305; 423/306; 423/326
[58] Field of Search ............... 423/326, 328, 329, 330, 423/305, 306; 502/214; 208/45

[56] References Cited

U.S. PATENT DOCUMENTS 4,440,871  4/1984  Lok et al. ............................ 502/214
4,880,611 11/1989  von Ballmoon et al. ............ 423/306

FOREIGN PATENT DOCUMENTS

WO89019 12/1989 PCT Int'l Appl. .

OTHER PUBLICATIONS

Lok et al., Zeolites, 1983, vol. 3, Oct., pp. 282-291.

Primary Examiner—R. Bruce Breneman
Attorney, Agent, or Firm—Alexander J. McKillop; Charles J. Speciale; Laurence P. Hobbes

[57] ABSTRACT

Crystalline aluminophosphate compositions having pore windows formed by 18 tetrahedral members are prepared from a forming mixture containing sources of aluminum, phosphorus and optionally, silicon. The forming mixture further contains a directing agent comprising a mixture of quaternary nitrogen compound and amine in a molar ratio of 0.01 to 0.025. The resulting product exhibits greater stability than compositions made from amine directing agent.

20 Claims, 2 Drawing Sheets

SYNTHESIS OF CRYSTALLINE ALUMINOPHOSPHATE COMPOSITION

CROSS-REFERENCE TO RELATED APPLICATIONS

This application is related by subject matter to U.S. application Ser. No., 07/543,634, filed on even date herewith.

BACKGROUND OF THE INVENTION

1. Field of the Invention

This invention relates to a new and useful improvement in synthesizing a crystalline aluminophosphate composition from a reaction mixture containing a specific new directing agent, hereinafter more particularly defined, the new crystalline composition synthesized, and to use of the crystalline composition synthesized in accordance herewith as a catalyst component for organic compound, e.g. hydrocarbon compound, conversion.

More particularly, this invention relates to an improved method for preparing a crystalline aluminophosphate composition from a forming mixture containing a directing agent comprising a quaternary nitrogen compound and amine in a molar ratio of 0.01 to 0.025. The addition of small amounts of quaternary nitrogen compound to the forming mixture results in a product comprising crystals having large pore windows measuring greater than about 10 Angstroms in diameter, such as, for example, greater than about 12 Angstroms in diameter, having enhanced thermal stability over compositions made from amine alone as directing agent.

2. Discussion of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842) merely to name a few.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous, is the "$H_1$" phase or hydrate of aluminum phosphate of F. d'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the Joint Commission for Powder Diffraction Standards (JCPDS), card number 15-274, and has an X-ray diffraction pattern exhibiting lines of Tables 1A, 1B and 1C, hereinafter presented. Once heated at about 110° C., however, the d'Yvoire material becomes amorphous or transforms to tridymite.

Silicoaluminophosphates of various structures are taught in U.S. Pat. No. 4,440,871. Aluminosilicates containing phosphorous, i.e. silicoaluminophosphates of particular structures are taught in U.S. Pat. No. 3,355,246 (i.e. ZK-21) and U.S. Pat. No. 3,791,964 (i.e. ZK-22). Other teachings of silicoaluminophosphates and their synthesis include U.S. Pat. No. 4,673,559 (two-phase synthesis method); U.S. Pat. No. 4,623,527 (MCM-10); U.S. Pat. No. 4,639,358 (MCM-1); U.S. Pat. No. 4,647,442 (MCM-2); U.S. Pat. No. 4,664,897 (MCM-4); U.S. Pat. No. 4,639,357 (MCM-5) and U.S. Pat. No. 4,632,811 (MCM-3).

A method for synthesizing crystalline metalloaluminophosphates is shown in U.S. Pat. No. 4,713,227 and an antimonophosphoaluminate is taught in U.S. Pat. No. 4,619,818. U.S. Pat. No. 4,567,029 teaches metalloaluminophosphates, and titaniumaluminophosphate is taught in U.S. Pat. No. 4,500,651.

The phosphorus-substituted zeolites of Canadian Patents 911,416; 911,417 and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550 and 3,697,550.

Lok et al (Zeolites, 1983, Vol. 3, Oct., 282–291) teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others. The article does not show use of the presently required directing agent compound for synthesis of the aluminophosphate composition of this invention. ZSM-5 and AlPO$_4$-5 are taught by Lok et al to be directed by tetrapropylammonium hydroxide from appropriate reaction mixtures. Choline compounds are taught to direct synthesis of ZSM-34, ZSM-38, ZSM-43, AlPO$_4$-5 and AlPO$_4$-7.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of (CH$_3$)$_2$(C$_2$H$_5$)N$^+$(CH$_2$)$_4$N$^+$(C$_2$H$_5$)(CH$_3$)$_2$ directing agent for synthesis of a novel zeolite; U.S. Pat. No. b 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,584,286, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 with a DABCO-C$_n$-diquat, n being 4,5,6 or 10, directing agent; and U.S. Pat. No. 4,539,193, teaching use of bis (dimethylpiperidinium) trimethylene directing agent for synthesis of ZSM-12.

U.S. Pat. No. 4,139,600 teaches a method for synthesis of zeolite ZSM-5, having a structure different from the presently synthesized crystal, from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonimum hydroxide, and ethanol, ammonimum hydroxide and ZSM-5 seeds. U.S. Pat. No. 4,100,262 teaches synthesis of ZSM-5 from a reaction mixture comprising a tetraalkylammonium source and a tetraureacobalt (II) complex.

Various diquaternary ammonium compounds have been identified as directing agents for a various assortment of crystalline materials. For instance, U.S. Pat. No.(s) 4,490,342 and 4,619,820 show synthesis of ZSM-23 from a reaction mixture containing the organic of U.S. Pat. No. 4,531,012, i.e. (CH$_3$)$_3$N$^+$(R)N$^+$(CH$_3$)$_3$, where R is a saturated or unsaturated hydrocarbon having 7 carbon atoms. U.S. Pat. No. 4,623,527 teaches numerous diquaternary ammonium compounds and shows use of (CH$_3$)$_3$N$^+$(CH$_2$)$_7$N$^+$(CH$_3$)$_3$ directing agent for synthesis of MCM-10.

U.S. Pat. No. 4,632,815 teaches numerous diquaternary ammonium compounds and shows use of (CH$_3$)$_3$N$^+$(CH$_2$)$_4$N$^+$(CH$_3$)$_3$ to direct synthesis of a Silica-X structure type. U.S. Pat. No. 4,585,639 teaches use of the diquaternary (C$_2$H$_5$)(CH$_3$)$_2$N$^+$(CH$_2$)$_4$ or 6 N$^+$(CH$_3$2$(C$_2$H$_5$)as directing agent for synthesis of ZSM-12. Synthesis of ZSM-5 is directed by the diquaternary (alkyl)$_3$N$^{+(CH_2)_6}$N$^+$(alkyl)$_3$, alkyl being propyl or butyl, in U.S. Pat. No. 4,585,638.

EPA 42,226 and U.S. Pat. No. 4,537,754 teach existence of numerous diquaternary ammonium compounds, but show use of (CH$_3$)$_3$N$^+$(CH$_2$)$_6$N$^+$(CH$_3$)$_3$ as directing agent for synthesis of EU-1. EPA 51,318 teaches use of the same diquaternary for synthesis of TPZ-3. It is noted that EU-1, TPZ-3 nd ZSM-50 have the same structure.

U.S. Pat. No. 4,440,871 to Lok et al. teaches the preparation of silicoaluminophosphate compositions from a forming mixture containing a templating agent of mono-, di-, tri-amines either alone or in combination with a quaternary ammonium compound or other templating compound, e.g., SAPO-11 from a mixture of tetra-n-butylammonium hydroxide and di-n-propylamine. PCT application WO 89/01912 to Davis et al., published 9 Mar. 1989, discloses the preparation of large pore crystalline aluminumphosphate compositions from forming mixtures containing structure-directing agents such as dipropylamine, diisopropylamine, tetrapropylammonium hydroxide, tetrabutylammonium hydroxide, dipentylamine, tripentylamine, tributylamine, alkylammonium and alkylphosphonium compounds in general, and mixtures of these; however, no guidance concerning the ratio of amines to ammonium compounds is given.

SUMMARY OF THE INVENTION

An improved, economical and reproducible hydrothermal synthesis method for preparing crystalline aluminophosphate exhibiting valuable properties is provided. For present purposes, the term "aluminophosphate" is defined as embracing aluminophosphate known as silicoaluminophosphates, materials which contain framework silicon as well as framework aluminum and phosphorus. The resulting aluminophosphate composition comprises crystals having a framework topology after heating at 110° C. or higher giving an X-ray diffraction pattern with lines shown in Table 1A of the specification.

The method of the invention comprises forming a reaction mixture hydrogel containing sources of aluminum oxide, phosphorus oxide, optionally silicon dioxide, directing agent (DA) which contains at least one quaternary nitrogen compound and at least one amine in a molar ratio of total quaternary nitrogen compound to total amine ranging from 0.01 to 0.025, and water and having a composition, in terms of mole ratios, within the following ranges:

|  | Broad | Preferred | Most Preferred |
|---|---|---|---|
| $SiO_2/Al_2O_3$ | 0 to 1 | 0 to 0.2 | 0 to 0.1 |
| $P_2O_5/Al_2O_3$ | 0.5 to 1.25 | 0.9 to 1.1 | 0.9 to 1.1 |
| $H_2O/Al_2O_3$ | 10 to 100 | 20 to 80 | 30 to 60 |
| $DA/Al_2O_3$ | 0.2 to 0.8 | 0.3 to 0.7 | 0.4 to 0.6 | and maintaining the mixture until crystals of the desired crystalline composition are formed.

Reaction conditions required of the instant invention are critical and consist of heating the foregoing reaction mixture to a temperature of from about 100° C. to less than about 160° C. for a period of time of from about 1 hour to about 80 hours. A more preferred temperature range is from about 130° C. to about 150° C. with the amount of time at a temperature in such range being from about 10 hours to about 30 hours. If the temperature is about 160° C. or more, the product composition will be diminished of desired large pore crystals characterized by the X-ray diffraction patterns of Tables 1A, 1B and 1C, hereinafter presented. Also critical of this synthesis procedure is the reaction mixture ratio of $P_2O_5/Al_2O_3$. When the ratio $P_2O_5/Al_2O_3$ is greater than about 1.25, especially when the temperature is 160° C. or higher, product composition will be diminished of desired large pore crystals characterized by the X-ray diffraction patterns of Tables 1A, 1B and 1C, hereinafter presented.

The solid product composition comprising the desired aluminophosphate is recovered from the reaction medium, as by cooling the whole to room temperature, filtering and water washing.

EMBODIMENTS

Figure 1:
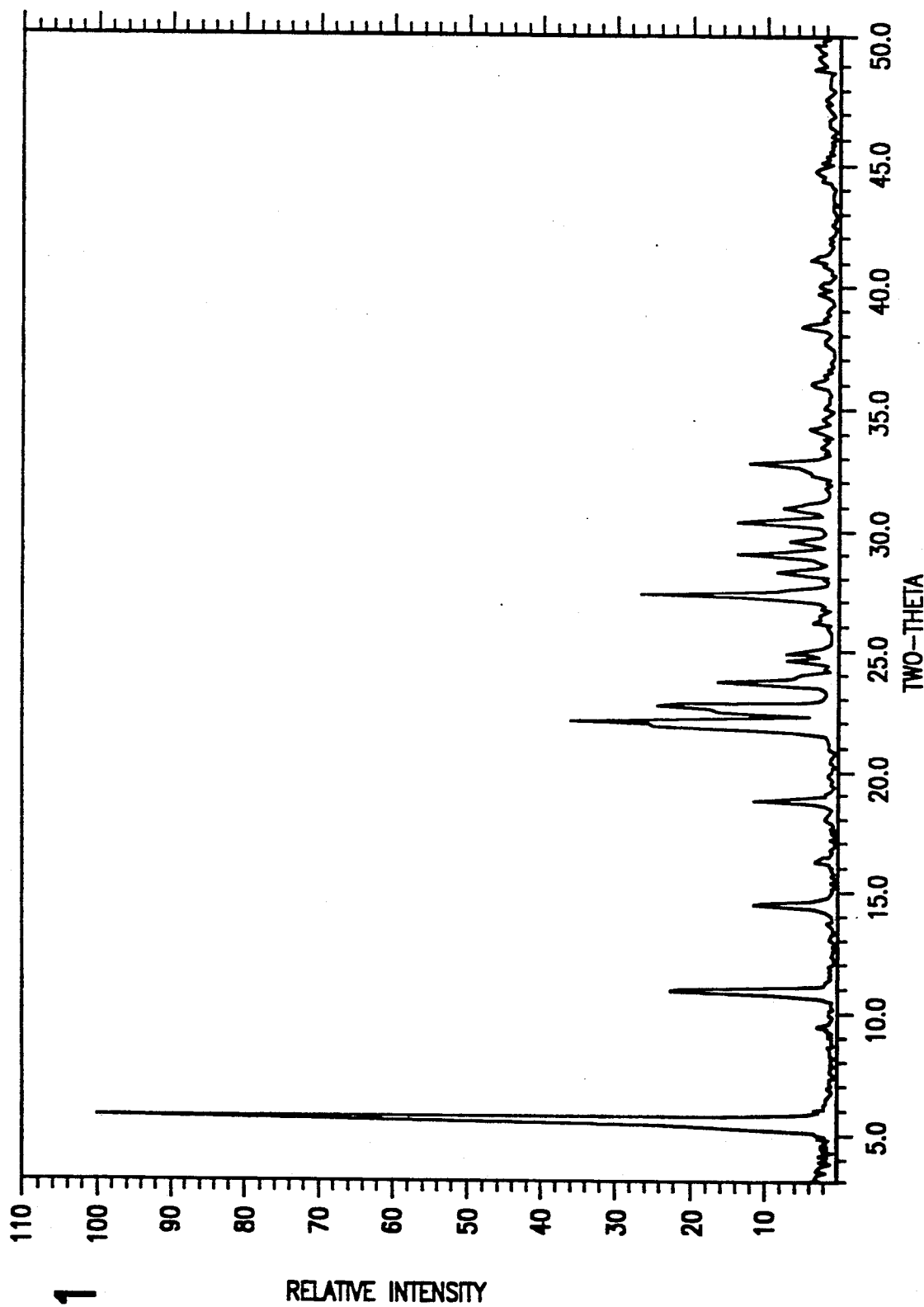
FIG. 1 is the X-ray powder diffraction pattern of the product of Experiment K as-synthesized, without calcination.

The crystalline aluminophosphate composition synthesized in accordance with the present method exhibits utility as a catalyst component for certain chemical reactions of interest, including cracking, hydrocracking, disproportionation, alkylation, isomerization and oxidation.

The amines comprising the organic directing agent may be selected from the group consisting of mono-, di-, tri- or polyamines. Particularly preferred amines include alkylamines, e.g., those wherein alkyl is of 1 to 5 carbon atoms. Exemplary amines include those selected from the group consisting of di-n-propylamine, di-isopropylamine, di-n-pentylamine, di-isopentylamine, di-neopentylamine, tributylamine, tripentylamine and trialkanolamines, e.g., triethanolamine and tri-isopropanolamine.

The quaternary nitrogen compounds used in the organic directing agent of the present invention comprise ammonium compounds having the formula:

wherein R is alkyl of from 1 to 20 carbon atoms, heteroalkyl of from 1 to 20 atoms, aryl, heteroaryl, cycloalkyl of from 3 to 6 carbon atoms, cycloheteroalkyl of from 3 to 6 carbon atoms, or combinations thereof; and X is an anion (e.g., fluoride, chloride, bromide, iodide, hydroxide, acetate, sulfate, carboxylate, etc.). Preferred quaternary nitrogen compounds used in making up the directing agent of the present invention include those of the above formula wherein R is alkyl of from 1 to 4 carbon atoms and X is halide or hydroxide. Such quaternary nitrogen compounds include those wherein the cation is selected from the group consisting of tetramethylammonium, tetraethylammonium, tetra-n-propylammonium and tetra-n-butylammonium.

The molar ratio of quaternary nitrogen compound to amine ranges from 0.01 to 0.025. Preferably, such molar ratio ranges from 0.01 to 0.015; even more preferably such ratio ranges from 0.012 to 0.014. The present invention is particularly useful in that it results in the preparation of the above-mentioned stable crystalline compositions using reduced amounts of expensive quaternary nitrogen compounds while avoiding the instability associated with crystalline compositions prepared from a pure amine directing agent.

The synthesis of the present invention may be facilitated when the reaction mixture comprises seed crystals, such as those having the structure of the product crystals. The use of at least 0.01%, preferably about 0.10%, and even more preferably about 1% seed crystals (based on total weight) of crystalline material in the reaction mixture will facilitate crystallization in the present method.

The reaction mixture composition for the synthesis of synthetic crystalline aluminophosphate hereby can be prepared utilizing materials which can supply the appropriate oxide. The useful sources of aluminum oxide include, as non-limiting examples, any known form of aluminum oxide or hydroxide, organic or inorganic salt or compound, e.g. alumina and aluminates. Such sources of aluminum oxide include pseudo-boehmite and aluminum tetraalkoxide. The useful sources of phosphorus oxide include, as non-limiting examples, any known form of phosphorus acids or phosphorus oxides, phosphates and phosphites, and organic derivatives of phosphorus. The useful sources of silicon oxide include, as non-limiting examples, any known form of silicic acid or silicon dioxide, alkoxy- or other compounds of silicon, including silica gel and silica hydrosol. Such sources of silicon oxide include amorphous precipitated silica, e.g., Ultrasil TM, fumed silica, and colloidal silica.

It will be understood that each oxide component utilized in the reaction mixture for preparing the present crystalline composition can be supplied by one or more essential reactants and they can be mixed together in any order. For example, any oxide can be supplied by an aqueous solution. The reaction mixture can be prepared either batchwise or continuously. Crystal size and crystallization time for the product composition comprising the desired aluminophosphate will vary with the exact nature of the reaction mixture employed within the above-described limitations.

The present product composition as synthesized hereby can be identified, in terms of mole ratios of oxides as follows:

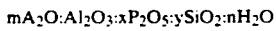

$$mA_2O:Al_2O_3:xP_2O_5:ySiO_2:nH_2O$$

wherein A represents the cation portion of the directing agent used in synthesis of the product composition, m is a number of from 0 (e.g. about 0.1) to about 0.8, x is a number of from about 0.5 to about 1.5, y is a number of from about 0.01 to about 0.5, and n is a number of from 0 (e.g. less than about 10) to about 100. Any organic material resulting from directing agent used in the synthesis procedure may be removed upon calcination.

The composition resulting from the present method comprises crystals having a framework topology which exhibit, even after being heated at 110° C. or higher, a characteristic X-ray diffraction pattern having the following characteristic values:

TABLE 1A

| Interplanar d-Spacings (A) | Relative Intensity |
|---|---|
| 16.4 ± 0.2 | vs |
| 8.2 ± 0.1 | w |
| 4.74 ± 0.05 | w | and more specifically the following characteristic values:

TABLE 1B

| Interplanar d-Spacings (A) | Relative Intensity |
|---|---|
| 16.4 ± 0.2 | vs |
| 8.2 ± 0.1 | w |
| 6.17 | |
| ± 0.05 | w |
| 6.21 | |
| 5.48 ± 0.05 | w |
| 4.74 ± 0.05 | w | and even more specifically the following characteristic values:

TABLE 1C

| Interplanar d-Spacings (A) | Relative Intensity |
|---|---|
| 16.4 ± 0.2 | vs |
| 8.2 ± 0.1 | w |
| 6.17 | w |
| ± 0.05 | w |
| 6.21 | |
| 5.48 ± 0.05 | w |
| 4.74 ± 0.05 | w |
| 4.10 ± 0.04 | w |
| 4.05 ± 0.04 | w |
| 3.94 | w |
| ± 0.04 | w |
| 3.96 | |
| 3.76 ± 0.03 | w |
| 3.28 ± 0.03 | w |

The X-ray diffraction lines in Tables 1A, 1B and 1C identify a crystal framework topology in the composition exhibiting large pore windows of 18-membered ring size. The pores are at least about 10 Angstroms in diameter, such as for example at least about 12 Angstroms, e.g., 12-13 Angstroms, in diameter. These lines distinguish this topology from other crystalline aluminosilicate, aluminophosphate and silicoaluminophosphate structures. It is noted that the X-ray pattern of the present composition is void of a d-spacing value at 13.6-13.3 Angstroms with any significant intensity relative the strongest d-spacing value. If a d-spacing value in this range appears in a sample of the present composition, it is due to impurity and will have a weak relative intensity. An 18-membered ring structure was published by M. Davis, D. Saldarriaga, C. Montes and J. Garces at the "Innovation in Zeolite Materials Science" meeting in Nieuwpoort, Belgium, Sep. 13-17, 1987. The large pore "AlPO$_4$-8" of U.S. Pat. No. 4,310,440 has a d-spacing value at 13.6-13.3 Angstroms with a medium-very strong relative intensity as reported in the patent. The d'Yvoire aluminum phosphate identified above, i.e. JCPDS card number 15-274, is not crystalline after being heated at about 110° C.

These X-ray diffraction data were collected with conventional X-ray systems, using copper K-alpha radiation. The positions of the peaks, expressed in degrees 2 theta, where theta is the Bragg angle, were determined by scanning 2 theta. The interplanar spacings, d, measured in Angstrom units (A), and the relative intensities of the lines, I/I$_o$, where I$_o$ is one-hundredth of the intensity of the strongest line, including subtraction of the background, were derived. The relative intensities are given in terms of the symbols vs=very strong (75-100%), s=strong (50-74%), m=medium (25-49%) and w=weak (0-24%). It should be understood that this X-ray diffraction pattern is characteristic of all the species of the present compositions. Ion exchange of cations with other ions results in a composition which reveals substantially the same X-ray diffraction pattern with some minor shifts in interplanar spacing and variation in relative intensity. Relative intensity of individual lines may also vary relative the strongest line when the composition is chemically treated, such as by dilute acid treatment. Other variations can occur, depending on the composition component ratios of the particular sample, as well as its degree of thermal treatment. The relative intensities of the lines are also susceptible to changes by factors such as sorption of water, hydrocarbons or other components in the channel structure. Further, the optics of the X-ray diffraction equipment can have significant effects on intensity, particularly in the low angle region. Intensities may also be affected by preferred crystallite orientation.

While the improved crystalline composition prepared by the method of the present invention may be used as a catalyst component in a wide variety of organic compound, e.g. hydrocarbon compound, conversion reactions, it is notably useful in the processes of cracking, hydrocracking, isomerization and reforming. Other conversion processes for which the present composition may be utilized as a catalyst component include, for example, dewaxing.

The present composition, when employed either as an adsorbent or as a catalyst component in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized composition can be prepared by heating same at a temperature of from about 200° C. to about 550° C. for from 1 hour to about 48 hours.

The composition prepared by the instant invention may be formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst comprising the present material is molded, such as by extrusion, the material can be extruded before drying or dried or partially dried and then extruded.

In the case of many catalysts, it may be desired to incorporate the hereby prepared aluminophosphate with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjunction with the present aluminophosphate, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized aluminophosphate include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalyst comprising the composition of this invention containing a hydrogenation component, reforming stocks can be reformed employing a temperature between 450° C. and 550° C. The pressure can be between 50 and 500 psig, but is preferably between 100 and 300 psig. The liquid hourly space velocity is generally between 0.1 and 10 $hr^{-1}$, preferably between 1 and 4 $hr^{-1}$ and the hydrogen to hydrocarbon mole ratio is generally between 1 and 10, preferably between 3 and 5.

A catalyst comprising the present composition can also be used for hydroisomerization of normal paraffins, when provided with a hydrogenation component, e.g. platinum. Hydroisomerization is carried out at a temperature between 250° C. to 450° C., preferably 300° C. to 425° C., with a liquid hourly space velocity between 0.1 and 10 $hr^{-1}$, preferably between 0.5 and 4 $hr^{-1}$, employing hydrogen such that the hydrogen to hydrocarbon mole ratio is between 1 and 10. Additionally, the catalyst can be used for olefin or aromatics isomerization employing temperatures between 0° C. and 550° C.

A catalyst comprising the aluminophosphate of this invention can also be used for reducing the pour point of gas oils. This process is carried out at a liquid hourly space velocity between about 0.1 and about 5 $hr^{-1}$ and a temperature between about 300° C. and about 425° C.

Other reactions which can be accomplished employing a catalyst comprising the composition of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following examples are presented.

EXAMPLE 1

6.47 g of $Al_2O_3$ (pseudoboehmite) was mixed with 18 g of $H_2O$ and then added to 10.8 g of 85 wt % $H_3PO_4$ diluted with 10 g $H_2O$. The resulting slurry was mixed at room temperature for 2 hours. 0.285 g tetramethylammoniumhydroxide (25 wt %) was added to 4.74 g di-n-propylamine. This organic mixture was added to the aluminophosphate gel then mixed at room temperature for 2 hours. The gel was loaded into a Teflon-lined autoclave and crystallized for 4 hours at 142° C. A typical X-ray diffraction pattern (from Experiment K in Table 2) is shown in FIG. 1.

The above procedure was repeated while varying the composition of the directing agent (DA) by substituting different amines and quaternary nitrogen compounds. The molar ratio of quaternary nitrogen compound to amine was also varied. These runs are summarized in Table 2 and show that quaternary nitrogen compound to amine ratio less than 0.0125 are not sufficient to prevent decomposition of the product in the mother liquor.

EXAMPLE 2

Figure 2:
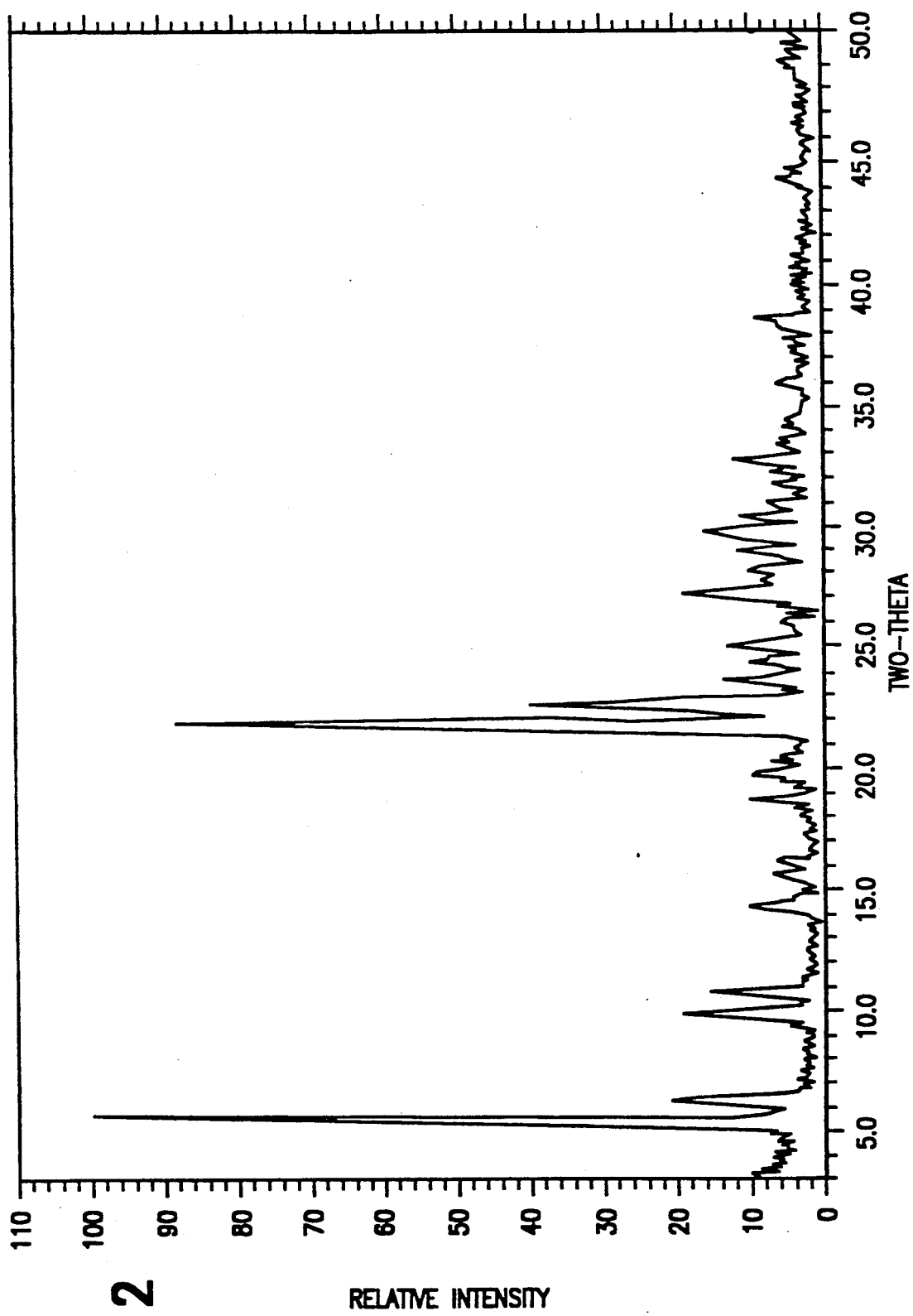
FIG. 2 is the X-ray powder diffraction pattern of the product of Experiment K after heating at 100° C. for 4 days.

The product of Experiment K in Table 2 was heated in a convection oven at 100° C. for 4 days. The X-ray diffraction pattern, depicted in FIG. 2 showed a trace of $AlPO_4$-8. In contrast, the crystalline composition of comparative Experiment A which utilized a single amine as directing agent decomposed to an undescriptive solid after 4 hours at 100° C. The product from Experiment C, a dual organic system, was also heated at 100° C. for 4 hours; traces of $AlPO_4$ were also observed.

EXAMPLE 3

A silicoaluminophosphate composition was prepared by adding 216 ml of $H_2O$ to 74.64 g pseudoboehmite and stirring. The resulting mixture was then added to a mixture of 120 ml $H_2O$ and 129.6g $H_3PO_4$ (85 wt %). 3.42 g of tetramethylammoniumhydroxide(TMAOH)

(25 wt %) was added to 56.88 g of di-n-propylamine (DPA) to form the directing agent mixture having a molar ratio of quaternary nitrogen compound to amine of 0.17. The directing agent mixture was then added and the resulting mixture stirred for 1.5 hours. 33.7 g fumed SiO$_2$ were then added resulting in the formation of a thick gel which was heated at 142° C. for 4 hours to provide a silicoaluminophosphate composition having the characteristic X-ray diffraction pattern of Table 1A.

TABLE 2

GEL COMPOSITIONS R$_1$ · R$_2$ · Al$_2$O$_3$ · P$_2$O$_5$ · 40 H$_2$O
(HEATED AT AUTOGENOUS PRESSURE FOR
4 HOURS AT 142° C.)

| EXPERIMENT | R$_1$ | R$_2$ | RESULT | ADDITIONAL OBSERVATIONS |
|---|---|---|---|---|
| A | DPA | — | * | |
| B | DPA | 1/40 TMA | | unknown x-ray pattern |
| C | DPA | 1/60 TMA | * | |
| D | DPA | 1/80 TMA | * | stable in mother liquor longer than A or E |
| E | DPA | 1/100 TMA | * | decomposed in mother liquor |
| F | DPA | 1/60 TEA | * + AlPO$_4$-11 | |
| G | DPA | 1/60 TPA | * | |
| H | DPA | 1/60 TBA | * | |
| I | DPentA | 1/60 TMA | * + amorphous impurities | |
| J | TEOA | 1/60 TMA | * + AlPO$_4$-5 | |
| K | TIPOA | 1/60 TMA | * | |
| L | DPA | 1/60 TMA | Si-* (added 0.3 SiO$_2$ to gel before heating) | |

DPA: dipropylamine
TBA: tetrabutylammonium
TMA: tetramethylammonium
DPentA: dipentylamine
TEA: tetraethylammonium
TEOA: triethanolamine
TPA: tetrapropylammonium
TIPOA: triisopropanolamine
* = aluminophosphate composition having x-ray diffraction characteristics of Table 1A

What is claimed is:

1. A method for synthesizing an alumiophosphate composition comprising crystals having a framework topology after heating at 110° C. or higher giving an X-ray diffraction pattern with lines shown as follows:

| Interplanar d-Spacings (Å) | Relative Intensity |
|---|---|
| 16.4 ± 0.2 | vs |
| 8.2 ± 0.1 | w |
| 4.74 ± 0.05 | w | which comprises (i) forming a reaction mixture hydrogel containing sources of aluminum oxide, phosphorus oxide, optionally silicon dioxide, directing agent (DA) which contains at least one quaternary nitrogen compound and at least one amine in a molar ratio of total quaternary nitrogen compound to total amine ranging from 0.01 to 0.025, and water and having a composition, in terms of mole ratios, within the following ranges:

| SiO$_2$/Al$_2$O$_3$ | 0 to 1 |
|---|---|
| P$_2$O$_5$/Al$_2$O$_3$ | 0.5 to 1.25 |
| H$_2$O/Al$_2$O$_3$ | 10 to 100 |
| DA/Al$_2$O$_3$ | 0.2 to 0.8 | and (ii) maintaining the mixture under sufficient conditions until crystals of the desired crystalline composition are formed, wherein said crystals have enhanced thermal stability at 100° C. over aluminophosphate compositions having said X-ray diffraction pattern made from amine alone as directing agent.

2. The method of claim 1 wherein said mixture has the following composition ranges:

| SiO$_2$/Al$_2$O$_3$ | 0 to 0.2 |
|---|---|
| P$_2$O$_5$/Al$_2$O$_3$ | 0.9 to 1.1 |
| H$_2$O/Al$_2$O$_3$ | 20 to 80 |
| DA/Al$_2$O$_3$ | 0.3 to 0.7 | and wherein said molar ratio of quaternary nitrogen compound to amine ranges from 0.010 to 0.015.

3. The method of claim 1 wherein said mixture has the following composition ranges:

| SiO$_2$/Al$_2$O$_3$ | 0 to 0.1 |
|---|---|
| P$_2$O$_5$/Al$_2$O$_3$ | 0.9 to 1.1 |
| H$_2$O/Al$_2$O$_3$ | 30 to 60 |
| DA/Al$_2$O$_3$ | 0.4 to 0.6 | and wherein said molar ratio of quaternary nitrogen compound to amine ranges from 0.010 to 0.015.

4. The method of claim 1 wherein said crystals give an X-ray diffraction pattern with lines shown in Table 1B.

5. The method of claim 1 wherein said crystals give an X-ray diffraction pattern with lines shown in Table 1C.

6. The method of claim 1 wherein said forming mixture comprises a source of silicon dioxide.

7. The method of claim 1 wherein said amines are selected from the group consisting of mono-, di-, tri- or polyamines and said quaternary nitrogen compounds are ammonium compounds having the formula:

R$_4$N$^+$X$^-$ wherein R is alkyl of from 1 to 20 carbon atoms, heteroalkyl of from 1 to 20 atoms, aryl, heteroaryl, cycloalkyl of from 3 to 6 carbon atoms, cycloheteroalkyl of from 3 to 6 carbon atoms, or combinations thereof; and X is an anion.

8. The method of claim 2 wherein said amines are selected from the group consisting of alkylamines wherein alkyl is of 1 to 5 carbon atoms and trialkanolamines and said quaternary nitrogen compounds are ammonium compounds having the formula:

R$_4$N$^+$X$^-$ wherein R is alkyl of from 1 to 4 carbon atoms and X is halide or hydroxide.

9. The method of claim 3 wherein said amines are selected from the group consisting of di-n-propylamine, di-isopropylamine, di-n-pentylamine, di-isopentylamine, di-n-pentylamine, tri-n-butylamine, tri-n-pentylamine, triethanolamine and tri-isopropanolamine and said quaternary nitrogen compounds are selected from the group consisting of tetramethylammonium, tetraethylammonium, tetrapropylammonium and tetrabutylammonium.

10. The method of claim 1 wherein said mixture further comprises seed crystals in sufficient amount to enhance synthesis of said aluminophosphate composition.

11. The recovered crystalline aluminophosphate composition of claim 1.

12. The recovered crystalline aluminophosphate composition of claim 2.

13. The recovered crystalline aluminophosphate composition of claim 3.

14. A crystalline aluminophosphate composition comprising crystals which exhibit an X-ray diffraction pattern having the lines shown as follows:

| Interplanar d-Spacings (A) | Relative Intensity |
| --- | --- |
| 16.4 ± 0.2 | vs |
| 8.2 ± 0.1 | w |
| 4.74 ± 0.05 | w | and contain directing agent (DA) which contains at least one quaternary nitrogen compound and at least one amine in a molar ratio of total quaternary nitrogen compound to total amine ranging from 0.01 to 0.025, wherein said crystals have enhanced thermal stability at 100° C. over aluminophosphate compositions having said X-ray diffraction pattern made from amine alone as directing agent.

15. A catalyst composition comprising the crystalline aluminophosphate of claim 14.

16. A crystalline aluminophosphate composition comprising crystals which exhibit an X-ray diffraction pattern having the lines shown as follows:

| Interplanar d-Spacings (A) | Relative Intensity |
| --- | --- |
| 16.4 ± 0.2 | vs |
| 8.2 ± 0.1 | w |
| 6.17 ± 0.05 | w |
| 6.21 | |
| 5.48 ± 0.05 | w |
| 4.74 ± 0.05 | w | and contain directing agent (DA) which contains at least one quaternary nitrogen compound and at least one amine in a molar ratio of total quaternary nitrogen compound to total amine ranging from 0.01 to 0.015 wherein said amine is selected from the group consisting of mono-, di-, tri- or polyamines and said quaternary nitrogen compounds are ammonium compounds having the formula:

$$R_4N^-$$

wherein R is selected from the group consisting of alkyl of from 1 to 20 carbon atoms, heteroalkyl of from 1 to 20 atoms, aryl, heteroaryl, cycloalkyl of from 3 to 6 carbon atoms, and cycloheteroalkyl of from 3 to 6 carbon atoms, wherein said crystals have enhanced thermal stability at 100° C. over aluminophosphate compositions having said X-ray diffraction pattern made from amine alone as directing agent.

17. A catalyst composition comprising the crystalline aluminophosphate of claim 16.

18. A crystalline aluminophosphate composition comprising crystals which exhibit an X-ray diffraction pattern having the following lines:

| Interplanar d-Spacings (A) | Relative Intensity |
| --- | --- |
| 16.4 ± 0.2 | vs |
| 8.2 ± 0.1 | w |
| 6.17 | w |
| ± 0.05 | w |
| 6.21 | |
| 5.48 ± 0.05 | w |
| 4.74 ± 0.05 | w |
| 4.10 ± 0.04 | w |
| 4.05 ± 0.04 | w |
| 3.94 | w |
| ± 0.04 | w |
| 3.96 | |
| 3.76 ± 0.03 | w |
| 3.28 ± 0.03 | w | and contain directing agent (DA) which contains at least one quaternary nitrogen compound and at least one amine in a molar ratio of total quaternary nitrogen compound to total amine ranging from 0.012 to 0.014 wherein said amines are selected from the group consisting of di-n-propylamine, di-isopropylamine, di-n-pentylamine, di-isopentylamine, di-neopentylamine, tri-n-butylamine, tri-n-pentylamine, triethanolamine and tri-isopropanolamine and said quaternary nitrogen compounds are selected from the group consisting of tetramethylammonium, tetraethylammonium, tetrapropylammonium and tetrabutylammonium, wherein said crystals have enhanced thermal stability at 100° C. over aluminophosphate compositions having said X-ray diffraction pattern made from amine alone as directing agent.

19. A catalyst composition comprising the crystalline aluminophosphate of claim 18.

20. A process for effecting catalytic conversion of an organic compound-containing feedstock which comprises contacting said feedstock under catalytic conversion conditions with the catalyst composition of claim 15.

* * * * *